United States Patent Office 3,770,666
Patented Nov. 6, 1973

---

3,770,666
VINYL ALCOHOL COPOLYMER ION-EXCHANGE MEMBRANES
Jean-Pierre Quentin, Lyon, France, assignor to Rhone-Poulenc S.A., Paris, France
No Drawing. Filed Oct. 12, 1970, Ser. No. 80,216
Claims priority, application France, Oct. 17, 1969, 6935725
Int. Cl. C08f 15/02, 27/00, 27/12
U.S. Cl. 260—2.1 E        11 Claims

ABSTRACT OF THE DISCLOSURE

Ion-exchange membranes particularly useful for deionisation or organic solvents are made from crosslinked vinyl alcohol polymers containing ion-exchange groups.

---

The present invention relates to the use of certain polymers of vinyl alcohol as ion-exchange membranes.

According to the present invention, there is provided an ion-exchange membrane which comprises a crosslinked polymeric material consisting essentially of recurring units of formula:

and

and, optionally,

in which R represents a hydrogen atom or a lower alkyl radical, e.g. of 1 to 6, typically 1 to 4, carbon atoms, R' represents a hydrogen atom or an acyl radical, preferably an acetyl radical, and Z represents a radical containing an ion-exchange group, the oxygen atoms of the units (I) being connnected to polyvalent organic radicals.

The radical Z can carry a cation exchange group or an anion exchange group. As cation exchange groups, the carboxylic acid, sulphonic acid and phosphonic acid groups and the corresponding salified groups may be quoted. Suitable anion exchangers include: a quaternary ammonium groups, especially those of formula:

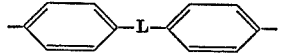

in which each of $R_1$, $R_2$ and $R_3$, which may be identical or different, represents a lower alkyl radical, e.g. of 1 to 6, typically 1 to 4, carbon atoms, and $A^\ominus$ is an inorganic or organic anion.

Suitable polyvalent radicals which can form the bonds which link the units of Formula I include the radicals of formula:

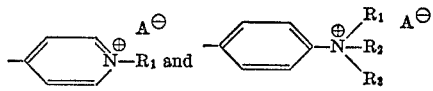

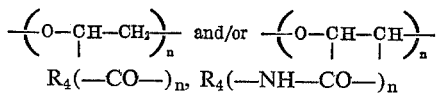

in which $n$ represents a positive integer greater than or equal to 2, and $R_4$ represents an aliphatic or aromatic radical of valency $n$.

The crosslinked polymers which form the membranes of this invention generally have a theoretical exchange capacity which is between 0.5 and 4 meq./g., preferably between 1 and 2.5 meq./g.

In this specification the expression "non-crosslinked vinyl alcohol copolymers" is used to describe copolymers which contain hydroxyethylene units and units of Formula II, optionally together with acyloxyethylene units. Furthermore, the expression "crosslinking agent" is used to describe a compound containing at least two groups capable of reacting with hydroxyl groups.

The crosslinked polymers constituting the membranes of this invention may be prepared by reaction of a crosslinking agent with a non-crosslinked vinyl alcohol copolymer.

The non-crosslinked vinyl alcohol copolymers can be prepared by any known means. Thus, the copolymers of vinyl alcohol and of vinyl-sulphonic acid salts are generally prepared by total or partial saponification of copolymers of vinyl esters and salts of vinyl-sulphonic acid, themselves prepared by the techniques described by W. Kern [Makromolekulare Chemie 32 37–44 (1959)]. If the saponification is only partial, the copolymers of vinyl alcohol and of an ion-exchange monomer also contain acyloxyethylene units. As comonomers which can be used, vinylphosphonic acids, acrylic acid and methacrylic acid, as well as the salts of these acids, may be mentioned.

As regards the non-crosslinked vinyl alcohol copolymers which carry anion exchange groups, these copolymers may generally be prepared by total quaternisation of copolymers of vinyl alcohol and of a vinyl monomer containing a tertiary nitrogen atom, themselves prepared by saponification of copolymers of vinyl esters. These latter copolymers can, for example, be prepared in accordance with the processes described in French Pats. Nos. 1,120,291, 1,177,509 and 1,215,655. Suitable comonomers with a tertiary nitrogen atom, used with the vinyl ester, include 2-vinyl-pyridine, 4-vinyl-pyridine, the 3-vinyl-picolines, the 3-vinyl-lutidines and para-dialkylaminostyrene. The quaternisation of the copolymers of vinyl alcohol and a monomer with a tertiary nitrogen atom is usually effected by means of an alkyl halide, such as methyl iodide, used in sufficient amounts to quaternise all the tertiary nitrogen atoms. Before being subjected to crosslinking, the non-crosslinked vinyl alcohol copolymers carrying anion exchange groups usually have a vinyl alcohol content of between 50 and 95%, preferably between 70 and 90%, by weight.

Crosslinking agents which can be used include polyacids and corresponding acid chlorides and acid anhydrides, dialdehydes, polyisocyanates and α-chlorinated polyethers. Suitable polyacids include succinic acid, adipic acid, maleic acid and phthalic acid. As polyisocyanates, there may be quoted hexamethylenediisocyanate and the diisocyanates of formula $Ar(NCO)_2$, wherein Ar is a radical containing at least one aromatic nucleus, such as the m-phenylene and p-phenylene, toluylene, xylene and diphenylene radicals, and the radicals $$-\!\!\left\langle\!\!\!\!\bigcirc\!\!\!\!\right\rangle\!\!-\!L\!-\!\!\left\langle\!\!\!\!\bigcirc\!\!\!\!\right\rangle\!\!-$$

wherein L represents the radicals $-CH_2-$, $-O-$, $-SO_2-$ and $-CO-$. The preparation of suitable α-chlorinated polyesters is described in United States Pat. No. 2,416,880.

The crosslinking of the vinyl alcohol copolymer is preferably effected in solution and at the reaction temperature of the reactive groups in question. In the case of the reaction of the vinyl alcohol copolymer with α-chlorinated polyethers this temperature is usually between 25 and 150° C., preferably between 50 and 100° C.

A preferred process for the preparation of the membranes of this invention comprises casting a solution containing, firstly, the non-crosslinked vinyl alcohol copolymer, and secondly, the crosslinking agent onto a planar surface, such as glass, heating the whole to the tempera-

3 ture at which the hydroxyl groups and the reactive groups of the crosslinking agent react and then, simultaneously or successively, evaporating the solvent and detaching the resulting film from the surface. According to this process, the crosslinking and the shaping of membranes take place together.

The membranes according to this invention are particularly valuable for the dionisation or demineralisation of organic solvents, especially polar organic solvents such as nitrobenzene. They can, in particular, be used in the apparatuses described in French Pat. No. 1,441,772 and in electrodialysis apparatuses.

The following examples further illustrate the present invention.

EXAMPLE 1

(A) Preparation of a vinyl alcohol-vinylpyridine copolymer 774 g. of vinyl acetate and 281 g. of 4-vinylpyridine are added to 3600 cm.$^3$ of a mixture of equal volumes of water and tertiary butanol, whilst stirring and under an inert atmosphere. The mixture is heated to 60° C., 31.65 g. of azo-bis(isobutyronitrile) are added and heating and stirring is continued for 20 hours. 1800 cm.$^3$ of tertiary butanol are then added at 20° C. and the whole is heated to 50° C. A solution of 360 g. of sodium hydroxide in 1800 cm.$^3$ of water is then added progressively over 30 minutes, and heating and stirring are continued for 2 hours.

The mixture is cooled and poured into 25 litres of tertiary butanol. The resulting precipitate is filtered off and then washed twice with 5 litre portions of methanol, cooled to 0° C.

The product is dried for 36 hours at 50° C./100 mm. Hg. 142 g. of this polymer are washed three times with 1 litre portions of water at 5° C., and dried to constant weight at 50° C./100 mm. Hg; 122 g. of polymer containing 2.20% by weight of nitrogen are thus obtained.

(B) Quaternisation 100 g. of the above copolymer are suspended in 1 kg. of a 10% strength (by weight) solution of methyl iodide in methanol. The mixture is stirred and heated under reflux for 7 hours. The polymer is thereafter filtered off, washed with methanol (2 portions of 500 cm.$^3$) and dried to constant weight at 50° C./100 mm. Hg.

A polymer containing 1.3% by weight of nitrogen, representing a theoretical exchange capacity of 0.93 meq./g., is thus obtained; the percentage by weight of hydroxyethylene units in this copolymer is 77%.

(C) Preparation of a membrane 1.5 g. of the above quaternised copolymer are dissolved in 30 cm.$^3$ of water. 0.15 g. of chlorinated polyoxyethylene (obtained by reaction of chlorine with polyoxyethylene of molecular weight 600, in accordance with the technique described in Example C of United States Pat. No. 2,416,880) are added. The mixture is stirred and heated to 90° C. for 6 hours, filtered, cast onto a 25 cm. x 12 cm. glass plate and dried at 50° C. under atmospheric pressure and then for 2 hours at 60° C./100 mm. Hg. The resulting film is detached from the glass plate to give a 50 microns thick transparent membrane.

This membrane was used for the deionisation of nitrobenzene. The apparatus used comprised a trough for receiving the nitrobenzene provided with 2 metal electrodes. A cation exchange membrane of the polystyrenesulphonic (acid) type (sold commercially by American Machine Foundry Corp. under reference 103C), having an exchange capacity of 1.3 meq./g., was glued onto the cathode; the membrane prepared above was glued to the anode. After being subjected to an electric field of 25 kv./cm. for one hour, the resistivity of the nitrobenzene, which originally was 10$^6$ Ω cm., had become 10$^{12}$ Ω cm.

EXAMPLE 2

(A) Preparation of a vinyl acetate/sodium vinyl sulphonate copolymer 1073 g. of vinyl acetate and 170.5 g. of sodium vinylsulphonate (73.2% purity) are dissolved in 3600 cm.$^3$ of dimethylsulphoxide (DMSO). 3.6 g. of azo-bis(isobutyronitrile) are added to the mixture which is heated to 60° C. and stirred, the heating and stirring then being continued for 16 hours. The whole is then poured into 20 litres of isopropanol, and the resulting solid is collected and dried to constant weight at 50° C./100 mm. Hg. 1180 g. of copolymer are thus obtained.

(B) Saponification

A solution of 200 g. of the above copolymer, in 3200 cm.$^3$ of methanol, is added over 2 hours at 50° C., to 1000 cm.$^3$ of a methanol solution containg 24 g. of potassium hydroxide. The temperature is kept at 50° C., and stirring continued, for 6 hours. The mixture is cooled and filtered and the product is washed with three 500 cm.$^3$ portions of methanol cooled to about 0° C., and dried as indicated above. 95 g. of a copolymer having a sulphur content of 4.3% by weight are thus obtained.

(C) Acidification

An aqueous solution containing 15% by weight of the above copolymer are passed through a 1 litre column packed with an acid cation exchange resin of sulphonated polystyrene, known by the name "Amberlite IR–120." After 15 successive passes through the column the acidity of the solution becomes constant and equal to 1.35 meq./g. of dry resin; its concentration is then 10% by weight. The content of hydroxyethylene units of this resin is 85% by weight.

(D) Preparation of a membrane 1.8 g. of a 67% strength by weight solution, in dioxane, of α-chlorinated polyoxyethylene prepared following the working method described in Example C of U.S. Pat. No. 2,416,880, starting from a polyoxyethylene of molecular weight 600, are added to 60 cm.$^3$ of the acid aqueous solution prepared under (C). The mixture is heated to 90° C. whilst stirring, and kept at this temperature for 6 hours. It is filtered, cast onto a 25 cm. x 12 cm. glass plate and dried for 15 hours at 50° C. under atmospheric pressure and then for 15 hours at 60° C./100 mm. Hg. On detaching from the plate, a 150 microns thick transparent membrane is obtained which was used in a nitrobenzene deionisation operation, following the procedure of Example 1, but with the membranes glued to the electrodes being the following:

(a) on the cathode, the membrane prepared according to this example, and
(b) on the anode, an anion exchange membrane of polystyrene with quaternary ammonium groups (the membrane being sold commercially by American Machine Foundry Corp. under reference A 104 B).

After applying an electric field of 25 kv./cm. for 10 minutes, the resistivity of the nitrobenzene, which was initially 10$^6$ Ω cm., has become 2×10$^{12}$ Ω cm.

I claim:

1. An ion-exchange membrane which consists essentially of a cross-linked copolymer consisting essentially of recurring units of the formula:

(I) 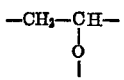

and (II) 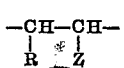

and, optionally, (III) 

in which R represents a hydrogen atom or a lower alkyl radical, R' represents a hydrogen atom or an acyl radical and Z represents a radical containing an ion-exchange group, selected from a carboxylic, a sulphonic and a phosphonic acid group, a salified group thereof and a quaternary ammonium group, the oxygen atom of (I) being connected to polyvalent organic radicals, selected from radicals of formula:

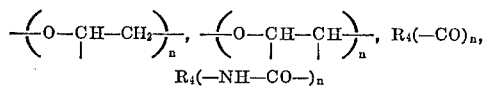

in which $n$ represents a positive integer greater than or equal to 2 and $R_4$ represents an aliphatic or aromatic radical of valency $n$.

2. A membrane according to claim 1, in which Z contains a sulphonic acid group.

3. A membrane according to claim 1, in which Z contains a quaternary ammonium group.

4. A membrance according to claim 3, in which Z contains a group of the formula

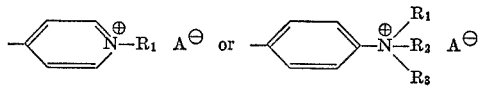

in which each of $R_1$, $R_2$ and $R_3$ which may be the same or different represents a lower alkyl radical and $A^\ominus$ represents an inorganic or organic anion.

5. A membrane according to claim 1, having a theoretical exchange capacity between 1 and 2.5 milliequivalents/gram.

6. A process for preparing a membrane as claimed in claim 1, which comprises casting a solution containing a non-crosslinked vinyl alcohol copolymer consisting essentially of recurring units of the formula:

(I)  and (II) —CH—CH—
                                        |   |
                                        R   Z and, optionally, (III) 

in which R represents a hydrogen atom or a lower alkyl radical, R' represents a hydrogen atom or an acyl radical and Z represents a radical containing an ion-exchange group, selected from a carboxylic, a sulphonic and a phosphonic acid group, a salified group thereof and a quaternary ammonium group and a cross-linking agent, selected from a polyacid, a polyacid chloride or anhydride, a polyisocyanate and an α-chlorinated poly (oxyethylene), onto a surface, heating the solution so as to cause cross-linking of the hydroxyl groups and simultaneously or subsequently evaporating the solvent and removing the resulting film from the surface.

7. A process according to claim 6, in which the surface is a glass plate.

8. A process according to claim 6, in which the non-crosslinked copolymer is derived from the quaternisation of a copolymer of vinyl alcohol and a vinyl monomer containing a tertiary nitrogen atom.

9. A process according to claim 8, in which the vinyl monomer is 2-vinylpyridine, 4-vinylpyridine, a 3-vinylpicoline, a 3-vinyl-lutidine or a para-dialkyl-aminostyrene.

10. A process according to claim 6, in which the non-crosslinked copolymer has a vinyl alcohol content of 70 to 90% by weight.

11. A process according to claim 6, in which the cross-linking agent is a polyacid or acid chloride or anhydride, a polyisocyanate or an α-chlorinated polyether.

References Cited
UNITED STATES PATENTS
3,644,225   2/1972   Quentin et al. _____ 260—2.1 E

FOREIGN PATENTS
896,244   5/1962   Great Britain.

OTHER REFERENCES
Trostyanskay et al.: Vysokomolekul. Soedin. 5(1), 44–48 (1963).

Nishimura et al.: Kagaku To Kogyo 39, 689–98 (1965).

MELVIN GOLDSTEIN, Primary Examiner

U.S. Cl. X.R.

260—2.2 R, 645